US009684057B2

United States Patent
Siomina et al.

(10) Patent No.: US 9,684,057 B2
(45) Date of Patent: *Jun. 20, 2017

(54) METHOD AND ARRANGEMENT OF DETERMINING TIMING UNCERTAINTY

(71) Applicant: UNWIRED PLANET, LLC, Reno, NV (US)

(72) Inventors: Iana Siomina, Solna (SE); Yang Zhang, Shanghai (CN)

(73) Assignee: Unwired Planet, LLC, Reno, NV (US)

( * ) Notice: Subject to any disclaimer, the term of this patent is extended or adjusted under 35 U.S.C. 154(b) by 424 days.

This patent is subject to a terminal disclaimer.

(21) Appl. No.: 14/220,800

(22) Filed: Mar. 20, 2014

(65) Prior Publication Data
US 2014/0206385 A1    Jul. 24, 2014

Related U.S. Application Data

(63) Continuation of application No. 12/963,077, filed on Dec. 8, 2010, now Pat. No. 8,692,715, and a
(Continued)

(51) Int. Cl.
*G01S 1/24* (2006.01)
*G01S 5/02* (2010.01)
(Continued)

(52) U.S. Cl.
CPC ............ *G01S 5/021* (2013.01); *G01S 5/0221* (2013.01); *G01S 5/10* (2013.01); *H04W 56/001* (2013.01); *H04W 88/08* (2013.01)

(58) Field of Classification Search
CPC ... G01S 1/24; G01S 5/10; G01S 5/021; G01S 5/0221; H04W 56/001; H04W 88/08
(Continued)

(56) References Cited

U.S. PATENT DOCUMENTS 5,969,679 A    10/1999  Bollinger et al.
6,898,430 B1 *  5/2005  Liberti ................... H04L 47/10
                                              455/11.1
(Continued)

FOREIGN PATENT DOCUMENTS

CN    1241889 A    1/2000
CN    1434305 A    8/2003
(Continued)

OTHER PUBLICATIONS

First Office Action, including Search Report, Corresponding to Chinese Patent Application No. 201080064151.3; Date of Mailing: Jun. 4, 2014; 12 Pages.
(Continued)

*Primary Examiner* — Harry Liu
(74) *Attorney, Agent, or Firm* — Nixon & Vanderhye P.C.

(57) ABSTRACT

A network node such as a positioning node, and a related method of determining an uncertainty of a timing measurement used for positioning of a wireless device are disclosed. The method includes estimating a timing measurement uncertainty, and determining if an uncertainty reducing measurement is available. If an uncertainty reducing measurement is available, the method also comprises determining a timing measurement uncertainty based on the estimated timing measurement uncertainty and the uncertainty reducing measurement.

44 Claims, 11 Drawing Sheets

Related U.S. Application Data continuation-in-part of application No. PCT/CN2010/000217, filed on Feb. 19, 2010.

(51) Int. Cl.
   *G01S 5/10* (2006.01)
   *H04W 56/00* (2009.01)
   *H04W 88/08* (2009.01)

(58) Field of Classification Search
   USPC .......................................................... 342/387
   See application file for complete search history.

(56) References Cited

U.S. PATENT DOCUMENTS

| | | | |
|---|---|---|---|
| 7,710,944 B1 | 5/2010 | Yoon | |
| 7,813,311 B2 | 10/2010 | Dick et al. | |
| 2002/0065089 A1 | 5/2002 | Soliman | |
| 2003/0086512 A1* | 5/2003 | Rick | G01S 5/0221 375/343 |
| 2004/0002828 A1 | 1/2004 | Swope et al. | |
| 2004/0027281 A1 | 2/2004 | Akopian et al. | |
| 2004/0087269 A1 | 5/2004 | Edge et al. | |
| 2007/0013584 A1 | 1/2007 | Camp, Jr. | |
| 2007/0024498 A1* | 2/2007 | Korneluk | G01S 19/05 342/357.42 |
| 2007/0179793 A1 | 8/2007 | Bagchi et al. | |
| 2008/0167052 A1* | 7/2008 | Wang | H04J 11/0069 455/456.6 |
| 2008/0287116 A1 | 11/2008 | Drane et al. | |
| 2009/0131073 A1 | 5/2009 | Carlson et al. | |
| 2009/0131075 A1 | 5/2009 | Mazlum et al. | |
| 2009/0179793 A1 | 7/2009 | Remondi | |
| 2009/0322601 A1* | 12/2009 | Ladd | G01S 19/235 342/357.48 |
| 2010/0117898 A1* | 5/2010 | Wigren | G01S 5/0257 342/357.43 |
| 2010/0234048 A1* | 9/2010 | Duffett-Smith | G01S 5/0221 455/456.6 |
| 2010/0323723 A1 | 12/2010 | Gerstenberger et al. | |

FOREIGN PATENT DOCUMENTS

| | | | |
|---|---|---|---|
| CN | 1628423 A | 6/2005 | |
| CN | 1705895 | 12/2005 | |
| CN | 1870816 | 11/2006 | |
| CN | 101472330 A | 7/2009 | |
| EP | 1 229 756 A2 | 8/2002 | |
| GB | 2 333 664 A | 7/1999 | |
| GB | WO 2010052496 A1 * | 5/2010 | ........... G01S 5/0027 |
| WO | 01/80461 | 10/2001 | |
| WO | WO 02/071095 A2 | 9/2002 | |
| WO | 2004/038451 | 5/2004 | |
| WO | WO 2004/109324 A1 | 12/2004 | |
| WO | WO 2005/025249 A1 | 3/2005 | |
| WO | 2005/055471 | 6/2005 | |

OTHER PUBLICATIONS

Extended European Search Report Corresponding to European Application No. 10845987.5; Date of Mailing: Jul. 1, 2014; 5 Pages.
U.S. Appl. No. 14/598,494, filed Jan. 16, 2015, Siomina et al.
Office Action mailed Nov. 30, 2015 in co-pending U.S. Appl. No. 14/598,494 14 pages.
European Extended Search Report dated Jul. 1, 2014 issued in EP 10845986.8, 6 pages.
English translation of Chinese First Office Action dated Sep. 25, 2014 issued in CN 201080064256.9, 12 pages.
English translation of Chinese Second Office Action dated Feb. 25, 2015 issued in CN 201080064151.3, 9 pages.
English translation of Chinese Second Office Action dated May 12, 2015 issued in CN 201080064256.9, 9 pages.
English translation of Chinese Third Office Action dated Oct. 26, 2015 issued in CN 201080064151.3, 11 pages.
English translation of Chinese Third Office Action dated Nov. 30, 2015 issued in CN 201080064256.9, 12 pages.
ETSI TS 136 455 V9.0.0 (Feb. 2010) LTE; Evolved Universal Terrestrial Radio Access (E-UTRA); LTE Positioning Protocol A (LPPa) (3GPP TS 36.455 version 9.0.0 Release 9), Feb. 2010, 49 pages.
International Search Report and the Written Opinion of the International Searching Authority corresponding to International Application No. PCT/CN2010/001984; Date of Mailing; Mar. 17, 2011; 14 Pages.
International Search Report and the Written Opinion of the International Searching Authority Corresponding to International Application No. PCT/CN2010/001983; Date of Mailing: Mar. 10, 2011: 11 pages.
International Search Report and the Written Opinion of the International Searching Authority corresponding to International Application No. PCT/CN2010/000217; Date of Mailing: Nov. 25, 2010; 9 pages.
3GPP TS 36.214 V9.2.0, $3^{rd}$ Generation Partnership Project; Technical Specification Group Radio Access Network; Evolved Universal Terrestrial Radio Access (E-UTRA); Physical Measurements (Release 9), Jun. 2010, 14 pages.
3GPP TSG RAN WG4 meeting #AH01, "Remaining issues on assistance data for OTDOA positioning—window size," Jan. 18-22, 2010, 3 pages.
3GPP TS 36.355 V9.3.0, $3^{rd}$ Generation Partnership Project; Technical Specification Group Radio Access Network; Evolved Universal Terrestrial Radio Access (E-UTRA) LTE Positioning Protocol (LPP) (Release 9) Sep. 2010, 113 Pages.
Canadian Office Action issued Jan. 3, 2017 in CA 2,790,142, 4 pages.

* cited by examiner

METHOD AND ARRANGEMENT OF DETERMINING TIMING UNCERTAINTY

CROSS REFERENCE TO RELATED APPLICATIONS

The present application is a continuation of and claims priority from U.S. application Ser. No. 12/963,077, filed on Dec. 8, 2010, which is a continuation-in-part of and claims priority from PCT International Application No. PCT/CN2010/000217, filed on 19 Feb. 2010, the disclosure of which is incorporated by reference herein in its entirety. This application is related to commonly assigned U.S. application Ser. No. 12/963,023, filed on Dec. 8, 2010, entitled "METHODS AND ARRANGEMENTS FOR MAINTAINING TIMING CHARACTERISTICS".

FIELD

The present invention relates to timing measurements for positioning. More particularly, the present invention relates to a network node and a method of determining an uncertainty of a timing measurement used for positioning of a wireless device.

BACKGROUND

The Universal Mobile Telecommunication System (UMTS) is one of the third generation mobile communication technologies designed to succeed GSM. 3GPP Long Term Evolution (LTE) is a project within the 3rd Generation Partnership Project (3GPP) to improve the UMTS standard to cope with future requirements in terms of improved services, such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a user equipment (UE) 150 is wirelessly connected to a radio base station (RBS) 110a, commonly referred to as an evolved NodeB (eNodeB), as illustrated in FIG. 1. Each eNodeB 110a-c serves one or more areas, referred to as cells 120a-c. In FIG. 1, a link between two nodes, such as the link between a positioning node here called Evolved Serving Mobile Location Center (E-SMLC) 100 and an eNodeB 110a,b,c, may be either a logical link, e.g. via higher-layer protocols and/or via other nodes, or a direct link. Hereinafter, a UE in a positioning architecture is a general term covering a positioning target which may, e.g., be a mobile device, a laptop, a small radio node or base station, a relay, or a sensor. A radio base station is a general term for a radio network node capable of transmitting radio signals. A radio base station may, e.g., be a macro base station, a micro base station, a home eNodeB, a beaconing device, or a relay.

UE positioning is a process of determining UE coordinates in space. Once the coordinates are available, they may be mapped to a certain place or location. The mapping function and delivery of the location information on request are parts of a location service which is required for basic emergency services. Services that further exploit a location knowledge or that are based on the location knowledge to offer customers some added value are referred to as location-aware and location-based services. The possibility of identifying a UE's geographical location has enabled a large variety of commercial and non-commercial services such as navigation assistance, social networking, location-aware advertising, and emergency calls, among others. Different services may have different positioning accuracy requirements imposed by an application. Furthermore, requirements on the positioning accuracy for basic emergency services defined by regulatory bodies exist in some countries. An example of such a regulatory body is the Federal Communications Commission (FCC) regulating the area of telecommunications in the United States.

There exist a variety of positioning techniques in wireless communications networks, differing in their accuracy, implementation cost, complexity, and applicability in different environments. Positioning methods may be broadly categorized into satellite based and terrestrial methods. Global Navigation Satellite System (GNSS) is a standard generic term for satellite navigation systems that enable UEs to locate their position and acquire other relevant navigational information. The Global Positioning System (GPS) and the European Galileo positioning system are well known examples of GNSS. In many environments, the position may be accurately estimated by using positioning methods based on GPS. Nowadays wireless networks also often have a possibility to assist UEs in order to improve an UE receiver sensitivity and a GPS start up performance, as for example in the Assisted-GPS (A-GPS) positioning method. However, GPS or A-GPS receivers are not necessarily available in all wireless UEs, and some wireless communications systems do not support A-GPS. Furthermore, GPS-based positioning may often have unsatisfactory performance in urban and/or indoor environments. There may therefore be a need for a complementary terrestrial positioning method.

There are a number of different terrestrial positioning methods. Some examples are:

Cell Identity (CID) based positioning, where the location is based on the identity of the current cell. Enhanced CID (E-CID) also takes e.g. Timing Advance (TA) into account to improve the positioning accuracy which may be important for positioning in large cells.

UE-based and UE-assisted Observed Time Difference Of Arrival (OTDOA), where the UE position is determined based on UE measurements of reference signals from three or more sites or locations.

Network based Uplink Time Difference Of Arrival (U-TDOA) positioning, where the UE position is determined based on several RBS measurements of a reference signal transmitted by the UE. Multi-lateration is then used to find a UE position as the intersection of hyperbolas when based on time difference measurements, or of circles when based on time of arrival measurements.

Fingerprinting or pattern matching positioning, where location fingerprints are collected in an off-line phase and are used for mapping measured signal strengths with a position. Location fingerprints are e.g. vectors of signal strength values of reference signals received from different RBSs in a position. Adaptive E-CID (AECID) is a fingerprinting positioning method that combines geographical cell descriptions corresponding to CIDs, received signal strengths and TA. AECID may also be extended to include Angle of Arrival (AoA) information. Whenever an A-GPS, A-GNSS or OTDOA high precision positioning is performed, the E-SMLC orders measurements of the radio properties which is a subset of geographical cell descriptions, TA, signal strengths and AoA. The radio property measurements are quantized and produce the fingerprint of the obtained high precision position.

Positioning methods based on time difference of arrival (TDOA) measurements have been widely used, for example in GSM, UMTS and cdma2000. For LTE networks, UE-assisted OTDOA positioning, which is based on downlink TDOA measurements, is currently being standardized. A corresponding UE-based mode is another possible candidate for later releases. The UE-assisted and UE-based modes differ in where the actual position calculation is carried out.

In the UE-assisted mode, the UE measures the TDOA of several cells and sends the measurement results to the network. A positioning node or a location server in the network carries out a position calculation based on the measurement results. In LTE, the positioning node in the control plane is referred to as an E-SMLC. The E-SMLC 100 is either a separate network node, as illustrated in FIG. 1, or a functionality integrated in some other network node. In the UE-based mode, the UE makes the measurements and also carries out the position calculation. The UE thus requires additional information for the position calculation, such as a position of the measured RBSs and a timing relation between the RBSs. In the user plane, the location or positioning node is referred to as Secure User Plane Location (SUPL) Location Platform (SLP).

The OTDOA positioning has won good acceptance among operators and vendors for LTE positioning. Some operators have already started to plan for OTDOA deployment in the LTE system. Moreover, the OTDOA related protocol in E-UTRAN has been adopted by the Open Mobile Alliance for user plane positioning. OTDOA is already standardized by 3GPP for GSM/EDGE RAN and UTRAN, but is not yet deployed in operational networks.

The OTDOA positioning is a multi-lateration technique measuring TDOA of reference signals received from three or more sites 210*a-c* (see FIG. 2*a*). To enable positioning, the UE should thus be able to detect positioning reference signals from at least three geographically dispersed RBS 210*a-c* with a suitable geometry, as the UE's position may be determined by the intersection 230 of at least two hyperbolas 240. This implies that the reference signals need to be strong enough or to have high enough signal-to-interference ratio in order for the UE to be able to detect them. With the OTDOA technique, the UE's position may be figured out based on the following measured parameters:

TDOA measurements of downlink reference signals;

Actual Relative Time Difference (RTD) between the RBS transmissions at the time when TDOA measurements are made;

Geographical position of the RBS whose reference signals are measured.

With more or longer TDOA measurements for each RBS, a better accuracy may be obtained. Measuring TDOA for signals from more than three RBSs typically also improves the positioning accuracy, although additional inaccurate measurements may also degrade the final accuracy. The accuracy of each of the measurements thus contributes to the overall accuracy of the position estimate.

There are several approaches to how to determine the RTD. One is to synchronize transmissions of the RBSs, as is generally done in a system using Time Division Duplex. In this case, RTD is a known constant value that may be entered in a database and used when calculating a position estimate. The synchronization must be done to a level of accuracy of the order of tens of nanoseconds in order to get an accurate position estimate. Ten nanoseconds uncertainty corresponds to three meters of error in the position estimate. Drift and jitter in the synchronization timing must also be well-controlled as they also contribute to the uncertainty in the position estimate. Synchronization to this level of accuracy is currently readily available through satellite based time-transfer techniques. Another alternative is to leave the RBSs to run freely without synchronization but within some constraint on the maximum frequency error. In this scenario, the RTD will change with time. The rate of change will depend on the frequency difference and jitter between RBSs.

LTE Positioning Protocol (LPP) and LTE Positioning Protocol annex (LPPa) are protocols used for carrying out OTDOA in a control plane solution in LTE. When receiving a positioning request for the OTDOA method, the E-SMLC requests OTDOA-related parameters from eNodeB via LPPa. The E-SMLC then assembles and sends assistance data and the request for the positioning to the UE via LPP. FIGS. 3*a-d* illustrate example architectures and protocol solutions of a positioning system in an LTE network. In the control plane solution, illustrated in FIG. 3*a*, the UE communicates with the E-SMLC transparently via the eNodeB and the Mobility Management Entity (MME) over LPP, and the eNodeB communicates with the E-SMLC transparently via the MME over LPPa. The user plane solution illustrated in FIG. 3*b* does not rely on the LPPa protocol, although 3GPP allows for the possibility of inter-working between the control and user plane positioning architectures. The SLP is the positioning node for user-plane positioning, similar to E-SMLC for control plane positioning, and there may or may not be an interface between the two positioning servers.

Since signals from multiple distinct sites need to be measured for OTDOA positioning, the UE receiver may have to deal with signals that are much weaker than those received from a serving cell. Furthermore, without an approximate knowledge of when the measured signals are expected to arrive in time and what is the exact pattern of a positioning reference signal, the UE would need to do signal search blindly within a large search window which would impact the accuracy of the measurements, the time it takes to perform the measurements, as well as the UE complexity. Therefore, to facilitate UE positioning measurements, the wireless network transmits assistance data to the UE. The assistance data and its quality are important for both the UE-based and the UE-assisted mode, although assistance data contents may differ for the two modes. The standardized assistance data includes among others a neighbor cell list with physical cell identities, a number of consecutive downlink sub frames used for the reference signals, an expected timing difference, and a search window. The expected timing difference and the search window, together referred to as search parameters, are crucial for an efficient correlation peak search.

According to the current 3GPP standard specifications, E-SMLC shall facilitate the expected OTDOA measurements at the UE side by providing the search window, allowing the UE to speed up the measurements and to keep a reasonable level of complexity. The quality or size of this search window impacts both the response time and the measurement accuracy and is therefore very important. With a narrower search window, the signal search performed by the UE is easier, although there is a higher risk of missing the correct signal peak if the search window has been derived with a lower confidence level.

The current 3GPP definition in LPP of the estimated timing difference, referred to as an expected Reference Signal Time Difference (RSTD), and of the search window, referred to as the expected RSTD Uncertainty, are:

Expected RSTD INTEGER (−8192.8191),

Expected RSTD-Uncertainty INTEGER (0.10234)

The resolution for both ExpectedRSTD and ExpectedRSTD-Uncertainty is 3×Ts, where Ts=1/(15000*2048) seconds according to the 3GPP specifications. For the reference cell and the measured neighbor cell operating on the same frequency, this corresponds to the search window [−ExpectedRSTD−Uncertainty×3×Ts, ExpectedRSTD−Uncertainty×3×Ts] centered at TREF+ExpectedRSTD×3×Ts, where TREF is the reception time of the beginning of the reference signal positioning occasion of the reference cell at the UE antenna connector.

The search window is defined as a symmetric range around the expected RSTD, and the expected RSTD uncertainty is the absolute value of the limits of the search window. If the search window is +/−30 μs, the corresponding RSTD uncertainty is 30 μs. A reduction of the uncertainty thus results in a smaller search window. The OTDOA measurement at the UE side is defined as a RSTD measurement in the 3GPP standard. RSTD is a relative timing difference between a neighbor cell and a reference cell. If T_SubframeRxNeighbor is a time when a target UE receives a start of a subframe from this neighbor cell, and T_SubframeRxRef is the time when the target UE receives the start of a subframe from the reference cell, the RSTD is equal to T_SubframeRxNeighbor-T_SubframeRxRef. In case of a cell geometry as the one illustrated in FIG. 2b, the time of the signal traveling from the radio node transmitter to the UE receiver in the reference cell 220, which is not necessarily a serving cell, gives a circle. For the sake of illustration, it may be assumed that the signal traveling time corresponds to the distance between the radio node, e.g. the eNodeB and the UE divided by the speed of light c. With such a cell geometry the maximum RSTD (RSTD_max) and minimum RSTD (RSTD_min) correspond to the rightmost and leftmost positions 250a, 250b, of the UE respectively. In this example, the search window may thus be deduced as follows:

$$\text{RSTD\_min} = \quad [1]$$
$$T_{bs1} - \frac{d2}{c} - \left(T_{bs2} - \frac{d1}{c}\right) = (T_{bs1} - T_{bs2}) + \frac{d1 - d2}{c} = \Delta T + \frac{d1 - d2}{c}$$
$$\text{RSTD\_max} = T_{bs1} - \frac{d4}{c} - \left(T_{bs2} - \frac{d3}{c}\right) =$$
$$(T_{bs1} - T_{bs2}) + \frac{d3 - d4}{c} = \Delta T + \frac{d3 - d4}{c}$$

where c is the speed of light, $T_{bs1}$ and $T_{bs2}$ are the System Frame Number (SFN) initialization time for RBS bs1, which is the reference RBS, and for RBS bs2, which is the neighbor RBS, respectively. Furthermore, d1 is the distance between the neighbor RBS bs2 and the UEs leftmost position 250b, d2 is the distance between the reference RBS bs1 and the UEs leftmost position 250b, d3 is the distance between the neighbor RBS bs2 and the UEs rightmost position 250a, and d4 is the distance between the reference RBS bs1 and the UEs rightmost position 250a, as illustrated in FIG. 2b. $\Delta T = T_{bs1} - T_{bs2}$ is the SFN initialization time difference between the reference cell or RBS bs1 and the neighbor cell or RBS bs2.

In the equations [1], the distances needed for deducing the search window may be obtained from measurements. The distance between the UE and the reference cell may be estimated from a TA value. If this distance is denoted d (d2=d3=d), then, as follows from equations [1], the search window is the largest when d1=ISD−d and d3=ISD+d, where ISD is the absolute neighbor-to-reference eNodeB distance which is typically known to a positioning node. Thus, for a UE located at distance d from the reference cell, equations [1] gives $$\text{RSTD\_min} = \Delta T + \frac{ISD - 2d}{c} \quad [2]$$
$$\text{RSTD\_max} = \Delta T + \frac{ISD}{c}$$

The UE may thus be informed that the estimated RSTD is equal to $$\Delta T + \frac{ISD - d}{c},$$

which corresponds to the center of the search window, and that the search window is given by [−d/c, d/c]. In this expression, d/c is the uncertainty signaled to the UE, which is the value that defines the search window or the range [−d/c, d/c]. The same applies for cells with different cell ranges since it is only the distance between the UE and the reference cell that matters.

In the current LTE standard, it has been specified that the maximum allowed expected RSTD uncertainty is five microseconds, which corresponds to a distance of 1.5 kilometers. The search window should thus not be larger than [−5 μs, 5 μs] or expressed in kilometers [−1.5 km, 1.5 km]. There is no clear description on how such a limited value of the expected RSTD uncertainty should be reached. It is well accepted that a cell ID based positioning may be used as a basis for deriving the uncertainty. This would provide an uncertainty which is proportional to the cell size, which may be enough in the case of a cell range smaller than 1.5 km.

However, cell coverage may be very big in a wireless network. Theoretically, the LTE standard supports a maximum cell range of 100 km. Providing a search window based on such a big uncertainty is not efficient enough for OTDOA measurements. Even though the cell ranges in operational networks are likely to be much smaller than the maximum cell range defined by the standard, they may not always be 1.5 km or smaller. Performing the measurements of reference signals with a too narrow search window on the other hand would result in that the searched reference signal peaks fall outside the search window with a high probability and either false peaks are detected or the reference signal detection fails.

SUMMARY

Some embodiments may enable more accurate determination of an uncertainty of a timing measurement which is used for positioning of a wireless device.

In accordance with some embodiments, in a network node of a wireless communication system, a method of determining an uncertainty of a timing measurement used for positioning of a wireless device is provided. The method includes estimating a timing measurement uncertainty, and determining if an uncertainty reducing measurement is available. It also includes when the uncertainty reducing measurement is available, determining the timing measurement uncertainty based on the estimated timing measurement uncertainty and the uncertainty reducing measurement.

In accordance with other embodiments, a network node is provided that is configured to be used in a wireless communication system, and configured to determine an uncertainty of a timing measurement used for positioning of a wireless device. The network node includes an estimating circuit configured to estimate a timing measurement uncertainty, a first determining circuit configured to determine if an uncertainty reducing measurement is available, and a second determining circuit configured to determine the timing measurement uncertainty based on the estimated timing measurement uncertainty and the uncertainty reducing measurement.

Some embodiments may allow for an uncertainty value fulfilling a standardized maximum search window in order to improve the positioning accuracy and the positioning measurement performance. Further, the UE complexity may be reduced as a result of the improved uncertainty of the timing measurement.

DETAILED DESCRIPTION

Figure 1:
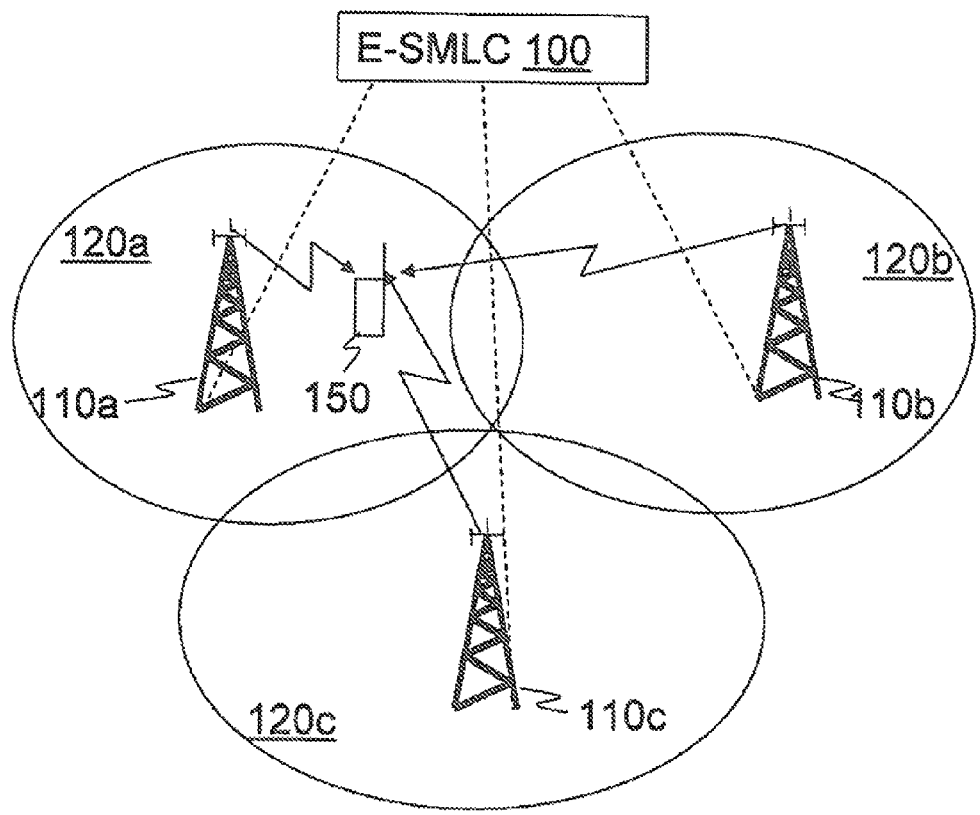
FIG. 1 illustrates schematically a conventional wireless communication system.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of a method and a node, they may also be embodied in a computer program product as well as in a system comprising a computer processor and a memory coupled to the processor, wherein the memory is encoded with one or more programs that may perform the method steps disclosed herein.

Embodiments are described herein by way of reference to particular example scenarios. Particular aspects are described in a non-limiting general context in relation to an LTE system and OTDOA positioning. It should though be noted that the embodiments may also be applied to other types of radio access networks using TDOA positioning, e.g. LTE-Advanced, UMTS, GSM, WiMAX, WiFi, or any mix of them. Furthermore, the timing measurement for which the uncertainty is determined in embodiments, is not limited to the disclosed radio technology or positioning method, but apply to any timing measurement such as timing difference or time of arrival measurements.

The problem of determining an RSTD uncertainty used for measurements for OTDOA positioning of a UE, where the uncertainty is small enough to comply with the standard specification and therefore allows for an accurate and efficient positioning measurement is addressed in embodiments of the invention. In some embodiments, the uncertainty of the expected RSTD signaled in the assistance data to the UE is equal to or below the maximum uncertainty allowed by the standard.

This disclosure relates to a determination of an uncertainty of a timing measurement, such as the RSTD measurement, which is used for positioning purposes in a network node of a wireless communications system. The network node may in one embodiment be the positioning node in an LTE system, which may e.g. be a stand alone E-SMLC. A conventional estimation of the uncertainty is first done. An uncertainty reducing measurement, which may be available to the positioning node, may be used to determine a smaller uncertainty than the previously estimated uncertainty. This may only be needed if the estimated uncertainty is larger than a threshold, such as the maximum allowed uncertainty according to standard specifications. In cases where no uncertainty reducing measurements are available to the node, another positioning method may be initiated to obtain measurements or positioning result that may be used to determine the search parameters including the uncertainty. Another alternative is that an uncertainty reducing measurement may be retrieved from some other node in the network. The uncertainty reducing measurement may e.g. be a signal strength or signal quality obtained by the eNodeB for the purpose of mobility or other radio resource management and retrieved by the positioning server from the eNodeB.

Figure 2A:
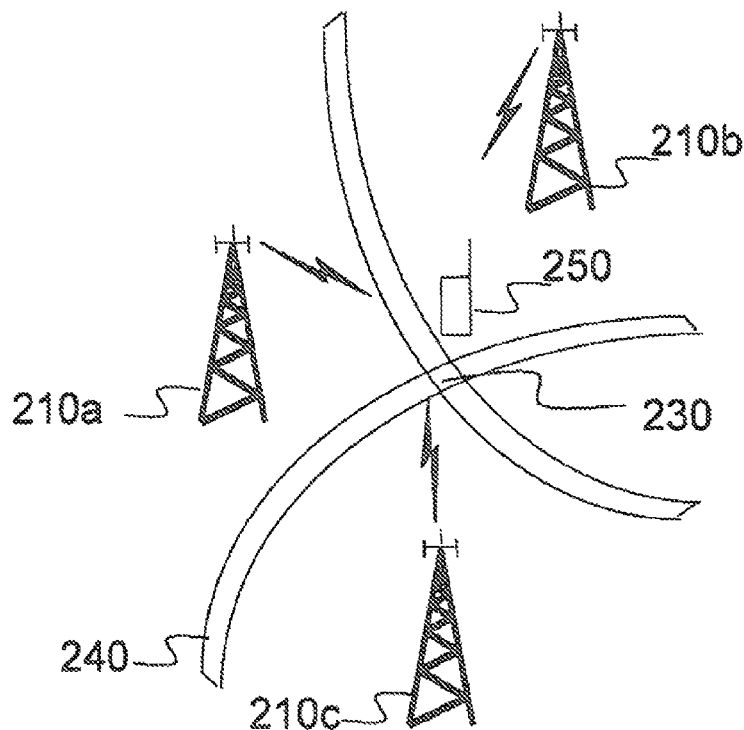
FIG. 2a illustrates the OTDOA principle.
Figure 2B:
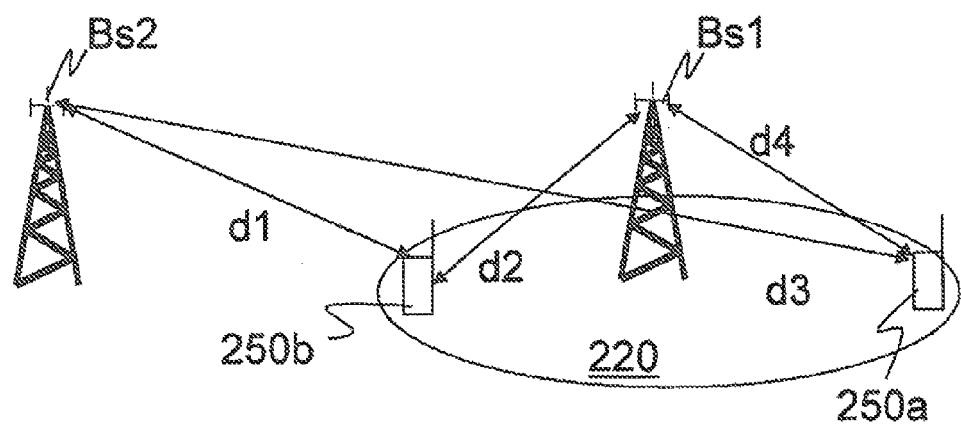
FIG. 2b illustrates with an example the concept of a search window in OTDOA positioning.
Figure 3A:
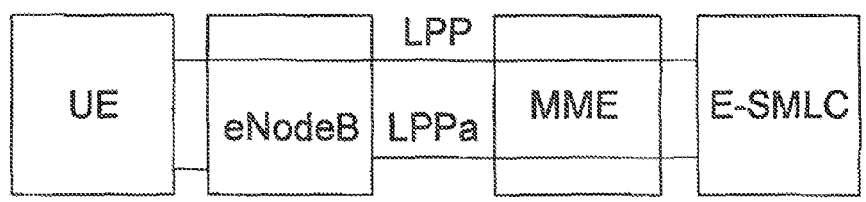
FIGS. 3a-3d illustrate an example of positioning related entities and protocols in LTE.
Figure 3B:
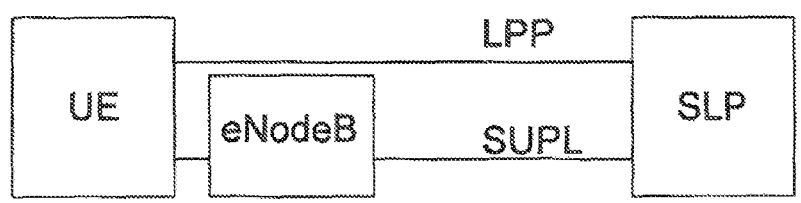
Figure 3C:
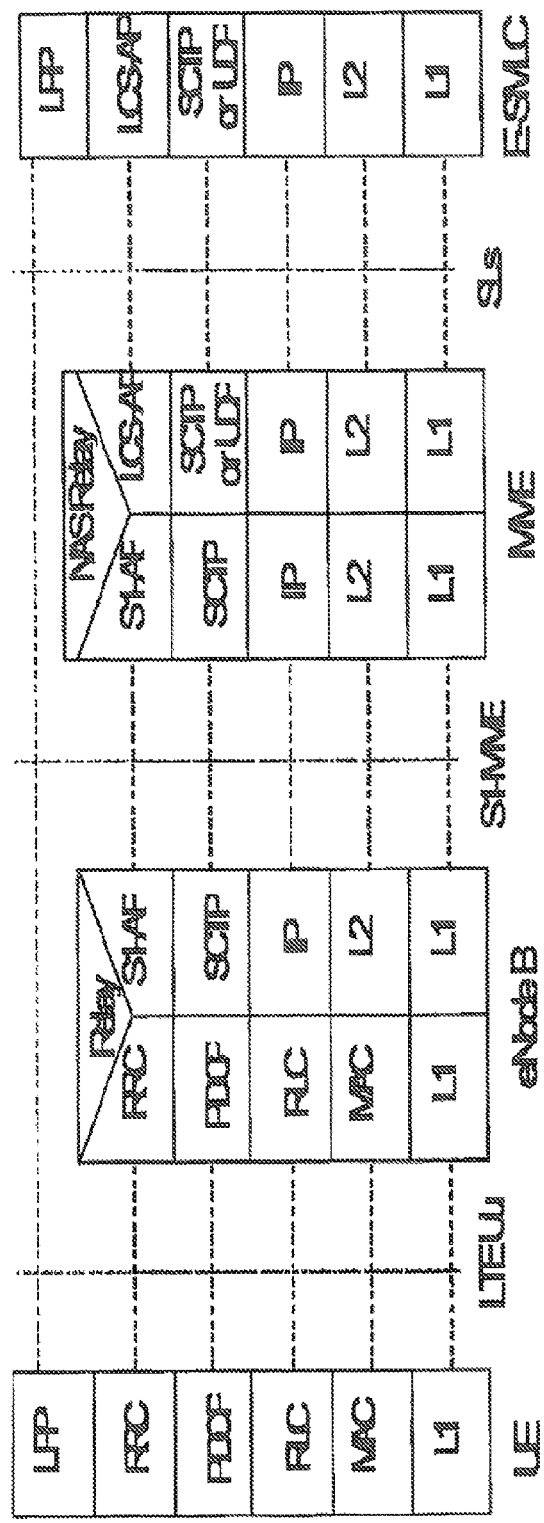
Figure 3D:
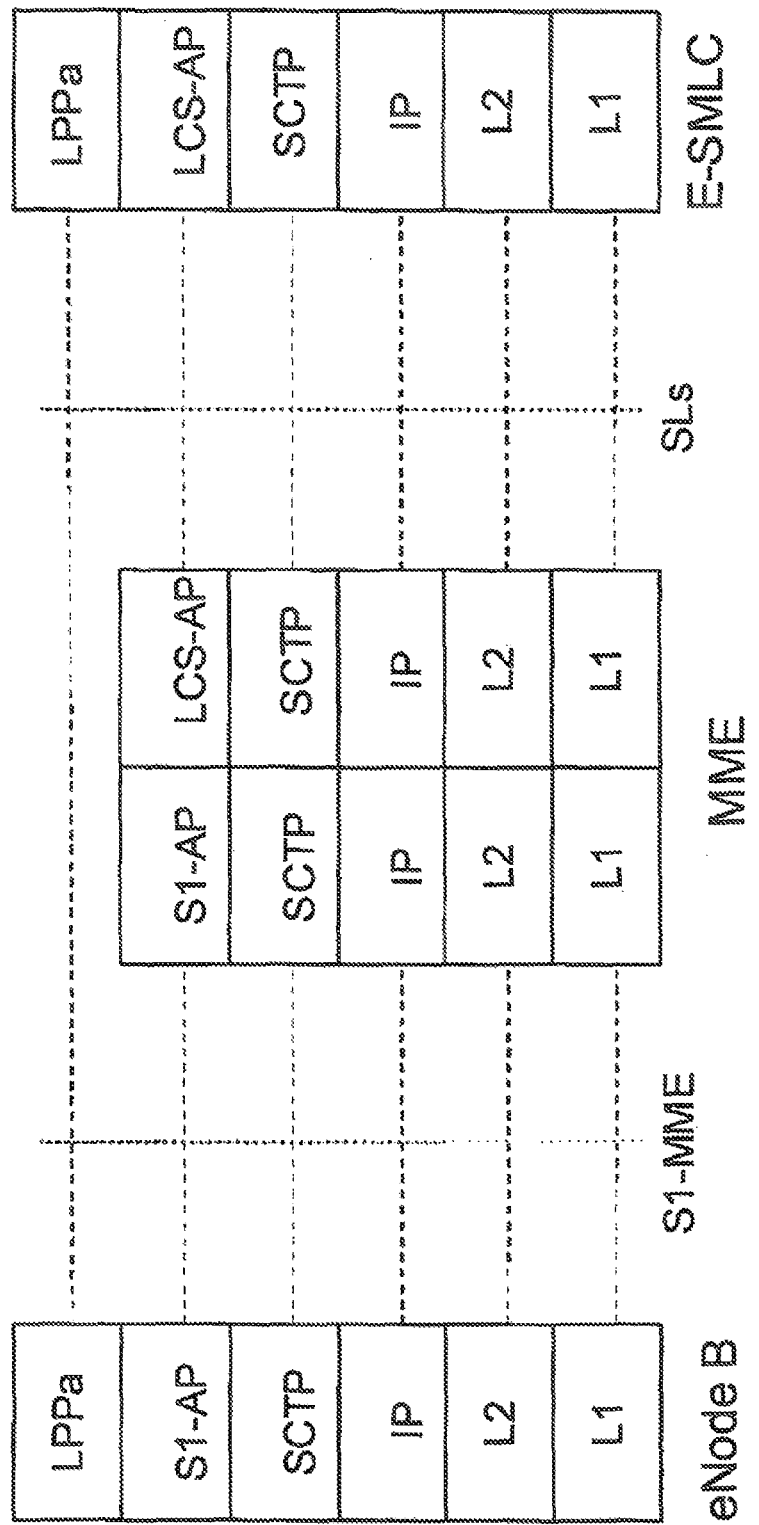

Another observation is that the RSTD uncertainty and the expected RSTD are usually deduced based on an omnisector assumption, as exemplified in FIG. 2b, i.e. assuming that an RBS is an omni-site with an antenna transmitting in all directions around the site. However, the omni-site is not a typical scenario in real life wireless networks, at least not for a macro environment. In the macro environment, sites with sector cells are common. Taking sector cells into account may thus also reduce the uncertainty, as will be described hereinafter.

An object of disclosed embodiments is to provide a solution for generating reliable and small RSTD uncertainties for OTDOA positioning, which will be exemplified in an LTE environment.

The following are different elements of embodiments, where each element may be considered as a standalone solution or may be used in any combinations with one or more of the other listed elements:

Utilize available measurements, such as A-GPS, AoA, Reference Signal Received Power (RSRP), and/or Reference Signal Received Quality (RSRQ) measurements to deduce or improve the OTDOA RSTD uncertainty;

Combine with a measured TA value to get a smaller RSTD uncertainty; and

Create and manage timing measurement maps and/or timing measurement uncertainty maps which contain the information to be used as a basis for deriving the timing measurement uncertainty. The timing measurement may, e.g., be RSTD or time of arrival measurements. Such maps may in principle be created for any type of measurements, thus mapping e.g. an RSTD uncertainty value with the different types of measurements. Such a map would allow deriving a RSTD uncertainty based on a combination of measurements.

If there are no available measurements e.g. no satellite reported for a UE-assisted A-GPS or failed measurements from a UE-based A-GPS, a specific positioning method may be initiated and the results may be used. The initiated positioning method may be utilizing e.g. the standardized RSRP/RSRQ measurements or other signal measurements such as other signal strength or signal quality measurements, which may be used to determine a smaller RSTD uncertainty.

Only cells for which feasible search parameter combinations may be derived are to be included in the assistance information and are therefore to be considered by UEs. Feasible search parameter combinations are those which at least satisfy either of the following:

They do not exceed some d_max, where d_max may e.g be the maximum cell range supported by a standard or the maximum cell range associated with the given cell and known to the UE and/or positioning node;

They ensure that the uncertainty of the expected RSTD is within the maximum search window allowed by the standard.

According to a first aspect, other measurements than positioning measurements and/or measurements from other positioning methods than the current are—when they are available—used to enhance the estimated OTDOA search parameters, and specifically to reduce an estimated uncertainty.

LTE positioning is primarily driven by the FCC requirements in US to localize a UE making an emergency call. A positioning method selection is performed according to a selection logic, which may be configured by a network operator. Typically, a method is selected based on e.g. positioning Quality of Service (QoS) requirements, positioning capability, and/or the client and service type. If the selected positioning method fails, another positioning method may be selected next, depending on the configuration. Usually, the order of positioning methods that is preferred by LTE operators is:

1) A-GPS positioning, as default positioning method;
2) OTDOA positioning, as primary fallback method;
3) E-CID, as secondary fallback method.

In many cases it is likely that already available information may be utilized to derive the search parameters in order to improve the search procedure in OTDOA positioning. For example, according to the preference list above, A-GPS measurements available from the default positioning method may be used as assistance information when an OTDOA positioning method is used as the primary fallback method. When A-GPS positioning fails due to too few satellites, there may still be measurements for those few satellites available. Other measurements may also be available, such as AoA measurements, UTDOA RSTD or timing measurements, which may also be considered when deriving search parameters as long as the RSTD uncertainty may be improved based on the measurements.

Other measurements that may be used to derive the OTDOA search parameters are RSRP- and RSRQ-like measurements defined for a Positioning Reference Signal (PRS), as well as the signal quality measurements which account for the interference on PRS resource elements only. The measurements will in the following be referred to as PRS-related signal quality measurements. The PRS-related signal quality measurements and extra information derived from signal measurements may be used for enhancing fingerprinting and the position estimates, when being combined with a reliable filtering approach.

Summarizing the different embodiments related to the first aspect, measurements that may be used as a basis for deriving or further improving the OTDOA RSTD uncertainty are measurements available from positioning methods that previously failed for the same UE, or other measurements which are already available by some other means in the positioning node. Furthermore one measurement may be further hybridized with any other measurement. Examples of such measurements are A-GNSS measurements such as A-GPS measurements, TA measurements, the PRS-related signal quality measurements described above, other RSRP and RSRQ measurements, and any measurements used in an AECID fingerprinting positioning method.

Even though the measurements that may be used for determining the OTDOA RSTD uncertainty are not available in the positioning node itself, they may be available in some other network node than in the positioning node. In one embodiment, measurements available in another network node or entity are retrieved by the positioning node, and may then be used to derive the RSTD uncertainty. An example may be signal strength or signal quality obtained by the serving eNodeB for the purpose of mobility or other radio resource management purpose and retrieved by the positioning server from the eNodeB for a given UE.

According to a second aspect, measurements that may reduce the RSTD uncertainty may not be available, and the determination of the RSTD uncertainty may then be done by first initiating another positioning method and basing the determination on measurements or a positioning resulting that is the result from the initiated positioning method. This is, e.g., the situation when OTDOA is the currently used positioning method for which a RSTD uncertainty should be determined, and other positioning methods that are expected to provide a better accuracy, such as the A-GPS positioning method, have failed. Even though A-GPS measurements may be available, they may not be enough for reducing the RSTD uncertainty to meet a positioning QoS, or to satisfy the maximum search window allowed by the standard. In this case, according to the second aspect, some other positioning method is used to generate more measurements and/or an estimated UE position with an uncertainty region, where the UE position with an uncertainty region is of interest for determining the OTDOA RSTD uncertainty. Some examples of such positioning methods are fingerprinting, AECID or even A-GPS or any A-GNSS method. Although an A-GNSS positioning method is expected to fail in achieving a final UE position, the extra measurements generated could still be used to improve the OTDOA assistance data search parameters.

The embodiments related to the second aspect are summarized hereinafter:

Another positioning method capable of generating a UE position estimate with an uncertainty region is used to determine the RSTD uncertainty;

Another positioning method is used to generate more measurements, even when the method is not expected to give a final UE position with a better accuracy, and the obtained measurements are hybridized with the previously available to determine the OTDOA RSTD uncertainty, for example the hybrid of A-GPS and TA measurements; and As a special case, the method using the PRS-related signal quality measurements described above is used, either for generating additional measurements or to determine a UE position with an uncertainty, which may be used for determining the OTDOA RSTD uncertainty to be transmitted in the assistance data to the UE.

When the RSTD uncertainty is unsatisfactory, it may be possible to improve it with AECID or fingerprinting positioning methods. For example, it may be possible to utilize the standardized RSRP/RSRQ measurements or other signal quality measurements to figure out a UE's approximate location with an associated uncertainty. Based on the UE's approximate location and the associated uncertainty, it may be possible to get a smaller RSTD uncertainty. According to a third aspect of the invention, it is proposed to generate and dynamically manage timing measurement maps for estimated and/or reported timing measurements, and timing measurement uncertainty maps, and associate them with other measurements and with estimated positions. In one embodiment, the timing measurement is RSTD and the corresponding maps are RSTD maps and RSTD uncertainty maps. Another example of the timing measurement is the time of arrival, for which the corresponding maps may be constructed in a similar way. Each such map comprises an association of geographical areas with certain tags. For example, a map may be defined in a similar way as for AECID, fingerprinting or pattern matching. Additionally, the data may be tagged with information capturing the number of RSTD measurements for a reported cell which relates directly to the RSTD quality and also has an impact on the position quality. The number of RSTD measurements also relates to the number of detected cells which will also impact the position quality. Interpolation or extrapolation is possible if RSTD information of interest is not a part of the stored maps. Furthermore, the uncertainty maps may be updated when the timing measurement uncertainty is improved by other means, such as those discussed above with regards to the first and second embodiment.

In another embodiment, uncertainty maps may be generated and managed for use by any other measurement, which may or may not be related to positioning. In one exemplary embodiment, the PRS-related signal quality measurements and/or the corresponding positioning method are used when generating the uncertainty maps.

The embodiments related to the third aspect are summarized hereinafter:

RSTD maps for estimated and/or reported RSTD and RSTD uncertainty maps are generated and dynamically managed to enhance OTDOA assistance information; The map data may also be tagged with the information capturing the number of RSTD measurements for a reported cell and the number of detected cells; and Uncertainty maps are generated for other types of measurements, such as timing measurements in general which are not necessarily directly involved in positioning but rather in other functionalities which may still associated with geographical areas. Some examples of other functionalities are tracking area update, neighbor cell list generation, mobility and handover, and cell association in heterogeneous networks.

For a network with omni cells, the estimated uncertainty is often assumed to be $$\left[\Delta T + \frac{ISD - 2d}{c}, \Delta T + \frac{ISD}{c}\right] \quad [3]$$

as already discussed earlier in this disclosure. It should be noted that when RSTD is to be measured, two cells are involved: the reference cell and the neighbor cell. It is often assumed that the reference cell is the serving cell, although this is not required by the standard. In many cases the estimated timing difference has a smaller uncertainty when defined with respect to the reference/serving cell. One reason is that more measurements may be available for the serving cell. However, this is not necessarily true. Therefore, according to a fourth aspect, the RSTD uncertainty may be estimated both with respect to the reference cell and with respect to the measured cell, and the smaller uncertainty of the two may be selected. The selection of the smaller uncertainty is justified by the fact that the two uncertainties are for the same measurement, but that they may vary e.g. depending on the cell ranges. In a simple example, assuming that it is possible to roughly estimate the distances to the serving cell denoted with d_bs1 and the measured cell denoted with d_bs2, the search window may be found from the range given in [3] above, where d=min(d_bs1, d_bs2). This may be possible e.g. when the TA measurement is available from multiple cells, which is possible in UMTS today e.g. for cells in the handover list.

It is the relative difference between d_bs1 and d_bs2 that is important. Therefore, given the distance with respect to one of the cells, the relative distance difference for the other one may be found e.g. from the measured path loss difference or by some other means. It is also possible that the maximum of d_bs1 and d_bs2 is known to the network, which may be a reasonable assumption in for example self-learning and self-optimized networks. The maximum distance could be smaller than the distance with respect to the reference cell derived from TA measurements. In this case, the smallest search window is chosen.

Although measuring TA for a non-serving cell is unlikely to be possible in LTE, it may still be available for a non-reference cell, e.g. when the reference cell is not the serving cell, when the serving cell has recently changed and TA may be extracted from the historical information, or when a deliberate serving cell change or handover may be instigated to obtain TA measurements for more than one cell. In the example with TA, the search window is defined with respect to the cell for which the TA for a given UE is the smallest.

In another embodiment, the area or size of the region defined by the uncertainty or the estimated uncertainty is considered when selecting the reference cell.

The embodiments related to the fourth aspect are summarized hereinafter:

The smallest RSTD uncertainty of the two RBS/cells involved in an RSTD measurements is used. This may be useful when the two cell ranges vary greatly in size e.g. The uncertainty range and the estimated RSTD are then modified accordingly;

The distance to the measured and serving cells may be obtained e.g. from earlier TA measurements for the cells in question using history TA measurements, from earlier position estimates, or from estimated maximum cell range;

The area/size of the uncertainty region is considered when selecting the reference cell for a UE;

A deliberate serving cell change or handover may be instigated to obtain TA measurements for more than one cell.

Figure 6A:
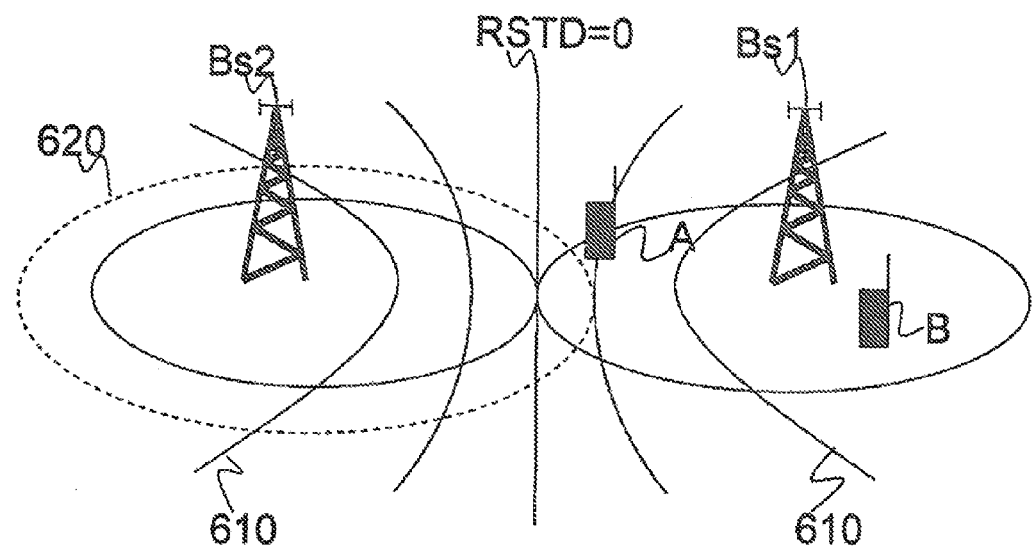
FIG. 6a illustrates some examples of infeasible combinations of parameters related to OTDOA positioning.

In some cases, limitations may exist which make the estimated or determined uncertainty or some parts of it infeasible. Some examples of limitations, also illustrated in FIG. 6a are (1) the maximum RSTD 610 supported by the standard or the known maximum cell range of particular cells, making a part of a RSTD uncertainty that goes beyond these limitations unfeasible; and (2) the maximum cell range 620 supported by the standard.

Since the agreed maximum estimated timing difference corresponds to 240 km, while the maximum supported cell range is 100 km, not all the combinations of the two parameters are feasible. According to a fifth aspects, limitations such as the maximum RSTD may be used when determining the RSTD uncertainty in order to reduce the uncertainty even more. Applying the limitations or constraints above would lead to a change of the shape of an uncertainty region, and a previously symmetric search window may now be asymmetric. The new uncertainty region obtained by applying any of the above limitations or their combinations is hereinafter referred to as the constrained uncertainty region.

For a network with omni-cells, a conventionally estimated uncertainty is given by [3] above. If RSTD_max denotes the maximum absolute RSTD, which may either be the maximum value supported by the network or the estimated maximum value, and RSTD_min denotes the corresponding minimum value, the two limitations of RSTD may be used to constrain the search window size according to the following:

$$\left[\max\left(\Delta T + \frac{ISD - 2d}{c}, \text{RSTD\_min}\right), \min\left(\Delta T + \frac{ISD}{c}, \text{RSTD\_max}\right)\right] \quad [4]$$

It is assumed that the left edge of the range is less than the right one, which otherwise would result in an empty search window. In FIG. 6a, UE B will e.g. not fulfill the maximum supported RSTD value.

Even when the minimum and the maximum RSTD limits are met, the UE may be located beyond a cell range which is the limit for where measurement of a signal from a cell is feasible, as e.g. UE A in FIG. 6a. The UE may be in a location where the received signal is too weak, even though the interference is low. This cell range may either be defined by the standard or may be known to the positioning node by any other means.

Figure 6B:
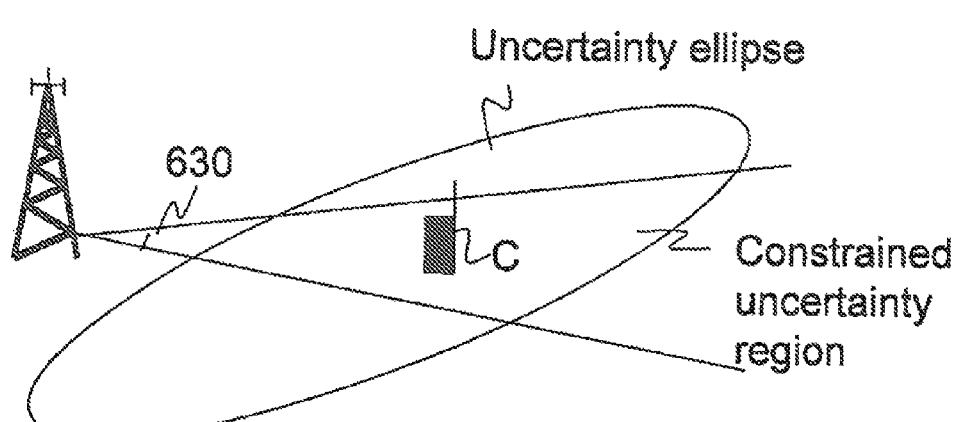
FIG. 6b illustrates an example of a constrained uncertainty region.

In addition to the cell range, other information may also be available for a further constraint of the RSTD uncertainty. One example is the estimated angle range between the direction of the UE-transmitted radio wave and the direction of the main lobe of the RBS antenna. An angle range 630 may also be derived based on an RBS beam width and information about the RBS's sector cells, as illustrated in FIG. 6b.

Constrained uncertainty regions may also be defined in three dimensions. A three dimension approach requires an adaptation of the two dimension approaches discussed herein.

For absolute or relative timing-based measurements, it is not desirable to measure on signals arriving via multipath, as that may have a negative impact on positioning performance. On the other hand, the largest uncertainty may be in such undesirable directions. In FIG. 6b the semi-major axis of the uncertainty ellipse is almost perpendicular to the line-of-site direction from the RBS to UE C. One embodiment therefore comprises the determination of a constrained uncertainty region, where unlikely or undesirable signal arrival directions are not taken into account.

The embodiments related to the fifth aspect are summarized hereinafter:

The maximum and/or the minimum limits for the timing measurement values are used to determine a feasible constrained uncertainty region; and Furthermore, other feasibility constraints, such as the maximum known cell range, an angle range defined based on cell sector information, or unlikely or undesirable of the signal arrival directions, may also be applied.

According to a sixth aspect, an optimization model and solution approaches for finding the search window are disclosed. In one embodiment, the search window may be obtained by mathematical optimization. With a constrained uncertainty region defined as:

$$\Omega = \{(x,y): g_i(x,y) \leq 0, h_k(x,y) = 0, i = [1,N], k = [1,K]\} \quad [5]$$

finding the search window [$\epsilon 1$, $\epsilon 2$] with respect to a point (x0,y0) is equivalent to solving two optimization problems. The first is a minimization problem to find $\epsilon 1$:

$$\epsilon_1 = f(x,y) \rightarrow \min, s.t.(x,y) \in \Omega \quad [6]$$

and the second one is a maximization problem to find $\epsilon 2$:

$$\epsilon_2 = f(x,y) \rightarrow \max, s.t.(x,y) \in \Omega \quad [7]$$

Lagrange multiplier approach may be used to tackle the problem. First, Lagrangian function is constructed as follows, $$L(x,y,\lambda,\mu) = f(x,y) + \Sigma_i \lambda_i g_i(x,y) + \Sigma_k \mu_k h_k(x,y) \quad [8]$$

Where $\lambda$ and $\mu$ are the Lagrange multiplier vectors associated with constraints formulated as inequalities and constraints formulated as equalities, respectively. Then, depending on the problem structure, i.e. specific objective function and constraint functions, a suitable solution approach may be adopted. As a general approach, when solving a minimization problem, the Lagrangian function is to be maximized with respect to Lagrange multipliers, i.e.

$$\max_{\lambda,\mu} \min_{(x,y)} L(x, y, \lambda, \mu) \quad [9]$$

The solution approach consists of two levels, a first outer level and a second inner level. In the outer level, the Lagrangian multiplier problem is solved, for example, by a subgradient optimization, and for each iteration corresponding to the inner level, the Lagrangian relaxation is to be solved. When the set $\Omega$ of constraints contains only equalities, a Newton-Raphson method may be used.

In the following example, a RSTD uncertainty for RSTD measurements with a circular uncertainty region is to be determined. It is assumed that the two dimensional coordinates of the two eNodeBs, eNodeB1 and eNodeB2, are: (−A,0) and (A,0), and the center of the uncertainty circle is (x0,y0), with uncertainty R. The distance difference between UE-eNodeB1 and UE-eNodeB2 is:

$$f(x,y) = \sqrt{(x+A)^2 + y^2} - \sqrt{(x-A)^2 + y^2} \quad [10]$$

which is subject to the constraint $$h(x,y) = (x-x0)^2 + (y-y0)^2 - R^2 \quad [11]$$

With this simple constraint, it is possible to design a rather simple search algorithm based on a binary search adopted for two dimensional space with the circle constraint checking, starting from a square with corners given by (x0±R, y0±R).

A more sophisticated approach would be to formulate the Lagrangian function $$L(x, y, \lambda) = \sqrt{(x+A)^2 + y^2} - \sqrt{(x-A)^2 + y^2} + \mu((x-x0)^2 + (y-y0)^2 - R^2) \quad [12]$$

and use the Newton-Raphson method to solve the system of equations:

$$\frac{\partial L}{\partial x} = \frac{x+A}{\sqrt{(x+A)^2 + y^2}} - \frac{x-A}{\sqrt{(x-A)^2 + y^2}} + 2\lambda(x-x0) = 0 \quad [13]$$

-continued $$\frac{\partial L}{\partial y} = \frac{y}{\sqrt{(x+A)^2+y^2}} - \frac{y}{\sqrt{(x-A)^2+y^2}} + 2\lambda(y-y0) = 0$$

$$(x-x0)^2 + (y-y0)^2 = R^2$$

For simplicity, an approximation may be applied. It may be seen that a point (x,y) which maximizes/minimizes function [10] above, also approximately maximizes/minimizes function $$g(x,y) = (\sqrt{(x+A)^2+y^2})^2 - (\sqrt{(x-A)^2+y^2})^2 = 4Ax \quad [14]$$

with x=x0+R and x=x0−R, respectively, which with the circle constraint gives y=y0. The approximations to s1 and c2 for the given example are found as min(f(x0+R, y0)) and max(f(x0±R,y0)), respectively.

The error introduced by this approximation is quite small for those small uncertainty circles. For large uncertainty circles, the error may be big in some extreme cases. A min/max value search around the neighborhood of the two points may be performed to improve the accuracy of the RSTD uncertainty estimation. However, this might not give much benefit compared with directly applying an extra protect margin for the RSTD uncertainty.

The above approximation for an uncertainty circle may be easily extended to an uncertainty ellipse case as well. For the uncertainty ellipse, the constraint equation [11] becomes $$h(x, y) = \frac{(x-x0)^2}{a^2} + \frac{(y-y0)^2}{b^2} - 1, \quad [11']$$

where a and b are semi-major and semi-minor axises respectively. In summary, the following embodiments related to the sixth aspect are proposed:

Find the uncertainty corresponding to the feasible constrained uncertainty region by formulating and solving it as an optimization problem taking the measurements and constraints into account, where the constraint may describe the feasible constrained uncertainty region; and Solve the optimization problem by a binary search, a Lagrange multiplier approach, or a small-range binary search right after the described approximation.

If the signaling of assistance data only allows symmetric search windows with respect to the window center, a conversion to a symmetric search window may be applied to the constrained uncertainty according to a seventh aspect. Such a conversion may not be needed for UE-based solutions though.

The search window is typically specified as a range [−ϵ,ϵ] centered in a point such as the expected RSTD. However, as already discussed, the uncertainty region definition and shape may vary for different types of measurements or different positioning methods whose output is to be used to enhance OTDOA search parameters. Furthermore, when multiple uncertainty reducing measurements are considered and/or the uncertainty reducing measurements and information are combined with additional information, such as feasible UE positions, the search region of interest may be of any shape. Such a combined and transformed uncertainty region has previously been referred to as a constrained uncertainty region. This implies that shape conversion may be need in order for the uncertainty region to be defined in a way supported by the assistance data signaling protocol. A trivial conversion is possible when the constrained uncertainty region is a circle, which gives us an uncertainty ϵ with is equal to the circle radius.

With constrained uncertainty regions, the search window is not necessarily symmetric, and may be determined to be [ϵ1, ϵ2], where the absolute value of ϵ1 is less or equal to the absolute value of ϵ2. In this case, a further conversion is applied to obtain the corresponding symmetric search window [−ϵ, ϵ], where $$\varepsilon = \frac{\varepsilon_2 - \varepsilon_1}{2}.$$

This conversion allows the systems/methods to adapt the search window to a format supported by the standardized signaling means. The expected value of the timing measurement, such as the expected RSTD, needs also to be changed accordingly to match the center of the search window.

The embodiments related to the seventh aspect are summarized hereinafter.

Shape conversion is applied to determine a search window, by transforming the constrained uncertainty region, where an empty constraint is a special case, to a range.

As a special case, an asymmetric search window may be converted to a symmetric search window.

Figure 4A:
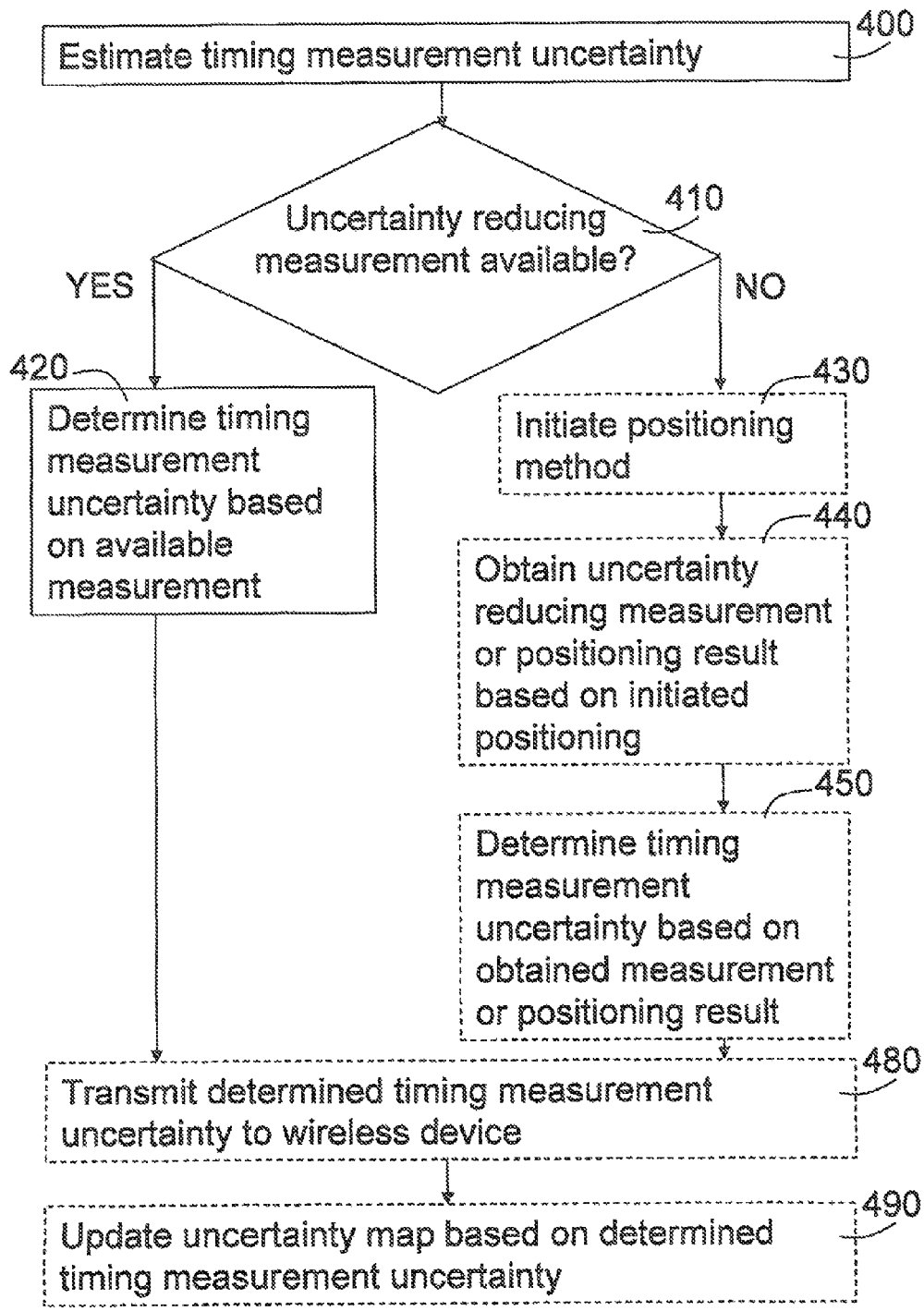
FIGS. 4a-c are flowcharts of the method in the network node according to some embodiments.

FIG. 4a is a flowchart of the method in a network node of a wireless communication system, of determining an uncertainty of a timing measurement used for positioning of a wireless device according to embodiments related to the first aspect described above. The network node may in one embodiment be the positioning node, such as the E-SMLC or the SUPL in LTE. The timing measurement may be a RSTD measurement which is the one used for OTDOA positioning. Alternatively it may also be a time of arrival measurement which is used e.g. in UTDOA positioning. Other time-difference-of-arrival-based positioning methods may also be addressed. The method comprises:

Block 400: Estimating a timing measurement uncertainty. The timing measurement uncertainty may in one embodiment be estimated based on a cell range. In another embodiment related to the fourth aspect described above, illustrated with reference to FIG. 4c, this estimation comprises the block 401 operations of estimating a first timing measurement uncertainty for a first cell and a second timing measurement uncertainty for a second cell, and step 402 of selecting the smallest of the estimated first and second timing measurement uncertainties.

Block 410: Determining if an uncertainty reducing measurement is available. The uncertainty reducing measurement may be one or more of an A-GNSS measurement, a TA measurement, a AoA measurement, an PRS-related signal quality measurement, other RSRP or RSRQ measurements, and other timing measurements.

Block 420: When the uncertainty reducing measurement is available, the method comprises determining a timing measurement uncertainty based on the estimated timing measurement uncertainty and the uncertainty reducing measurement. The determining may also be based on a map associating a geographical area and the timing measurement such as an RSTD map, and/or information comprising one or more of a cell sector information, an undesirable signal arrival direction, a cell range limit and a reference signal time difference limit.

When the uncertainty reducing measurement is not available the method also comprises, according to embodiments related to the second aspect:

Block 430: Initiating a positioning method. The positioning method may e.g. be one of an A-GNSS method, an AECID positioning method or any other fingerprinting method.

Block 440: Obtaining the uncertainty reducing measurement and/or a positioning result from the initiated positioning method.

Block 450: Determining the timing measurement uncertainty based on the estimated timing measurement uncertainty and the obtained uncertainty reducing measurement and/or positioning result. The determining may also be based on a map associating a geographical area and the timing measurement, and/or information comprising one or more of a cell sector information, an undesirable signal arrival direction, a cell range limit and a reference signal time difference limit.

According to one embodiment, the method further comprises:

Block 480: Transmitting the determined timing measurement uncertainty in assistance data to the wireless UE. The assistance data is used by the wireless UE to perform the timing measurement. The wireless UE may be any device being positioned e.g. a wireless terminal, a laptop, a small RBS, a sensor, or a beacon device.

According to still another embodiment related to the third aspect, the method also comprises:

Block 490: Updating an uncertainty map based on the determined timing measurement uncertainty. The uncertainty map associates a geographical area with a timing measurement uncertainty. An uncertainty map may also comprise other measurements as in the AECID maps, and the maps may be used for other purposes than positioning as well. The updating may comprise adding new values, but also e.g. an averaging of values over time.

Figure 4B:
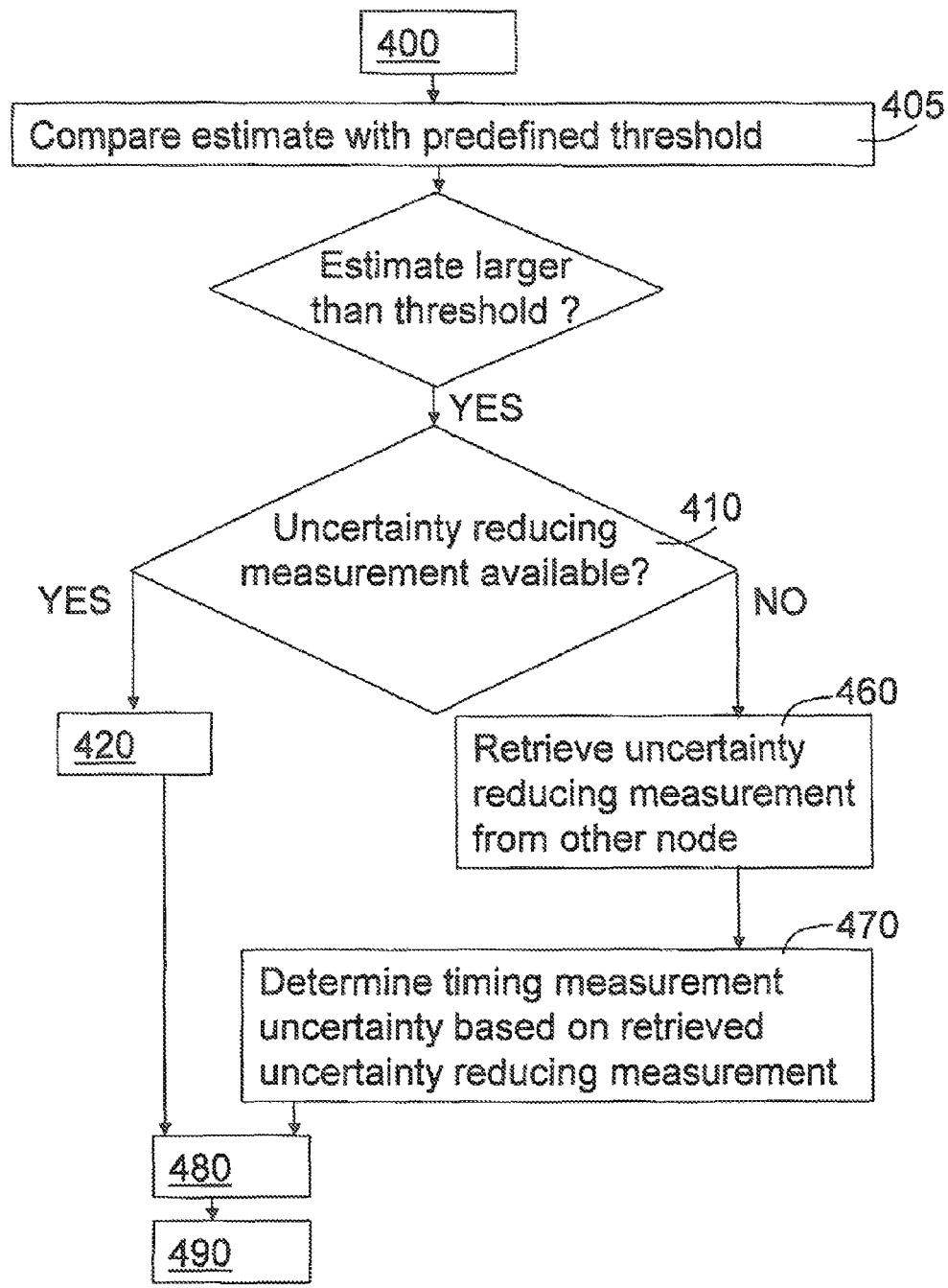
Figure 4C:
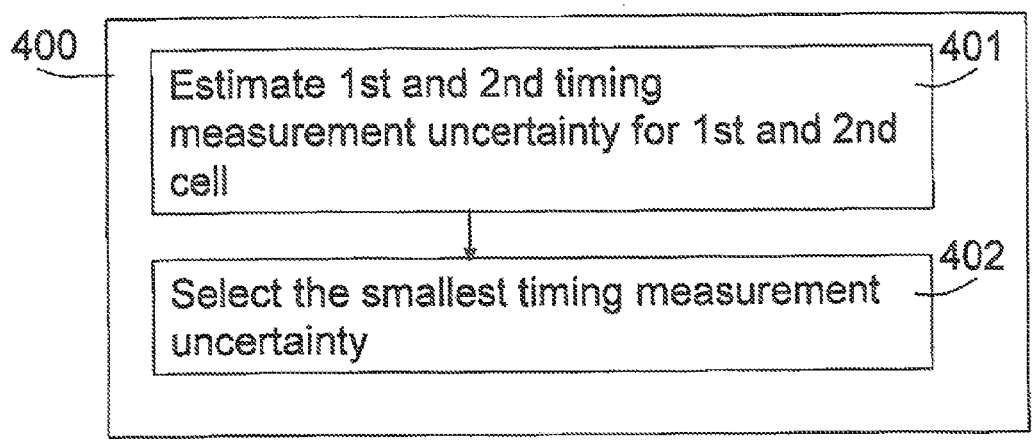

FIG. 4b is a flowchart of the method in the network node of a wireless communication system, according to embodiments. According to one embodiment related to the fourth aspect described above, the method further comprises after the block 400 operations of estimating the timing measurement uncertainty:

Block 405: Comparing the estimated timing measurement uncertainty with a predefined threshold. Determining if the uncertainty reducing measurement is available in block 410 is then only performed when the estimated timing measurement uncertainty is larger than the predefined threshold. The threshold may in one embodiment correspond to the standardized 5 μs limit of how large the uncertainty may be. If the timing measurement uncertainty estimation is smaller than 5 μs, there is no need to perform the uncertainty reducing method steps according to the described embodiments. The threshold may in an alternative embodiment be configured dynamically, statically, or semi-statically.

According to an embodiment the method also comprises when no uncertainty reducing measurement is available:

Block 460: Retrieving the uncertainty reducing measurement from another network node.

Block 470: Determining the timing measurement uncertainty based on the estimated timing measurement uncertainty and the retrieved uncertainty reducing measurement. The determining may also be based on a map associating a geographical area and the timing measurement, and/or information comprising one or more of a cell sector information, an undesirable signal arrival direction, a cell range limit and a reference signal time difference limit. As the determining of the timing measurement uncertainty in some cases may result in an asymmetric uncertainty region, this step may comprise applying a shape conversion to convert the determined timing measurement uncertainty to a symmetric uncertainty range according to one embodiment. According to an alternative embodiment, this step may comprise performing a mathematical optimization based on a Lagrange multiplier approach to convert the determined timing measurement uncertainty to a symmetric uncertainty range.

The systems/methods also comprise the operations blocks 420, 480 and 490 already described with reference to FIG. 4a. Furthermore, the operations of blocks 460 and 470 may be combined with those of blocks 430, 440 and 450 described with reference to FIG. 4a, and may then be performed either before block 430 or after block 450.

Figure 5A:
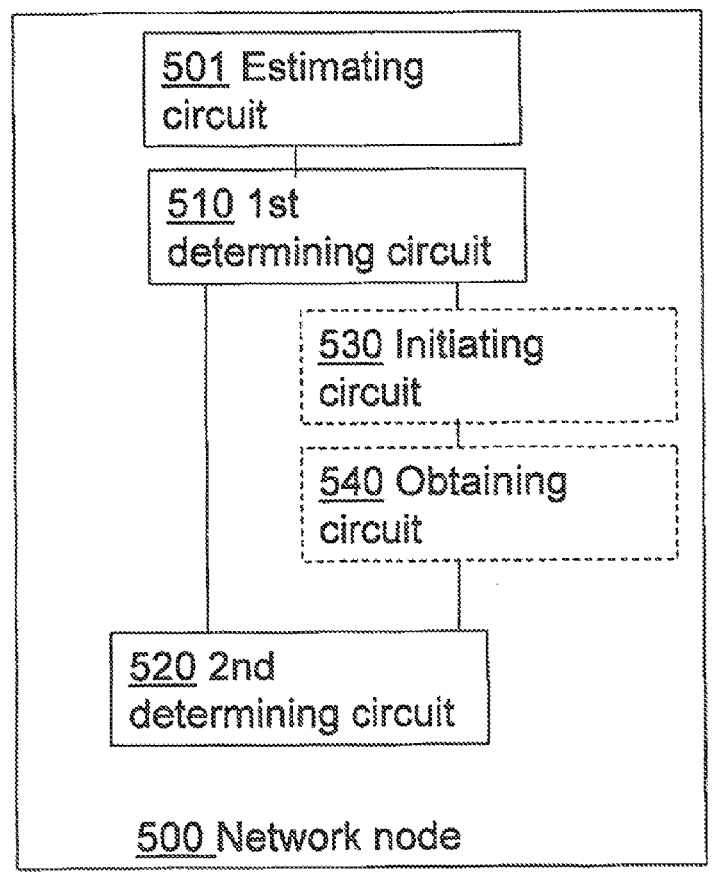
FIGS. 5a-c illustrate schematically a network node according to some embodiments.
Figure 5B:
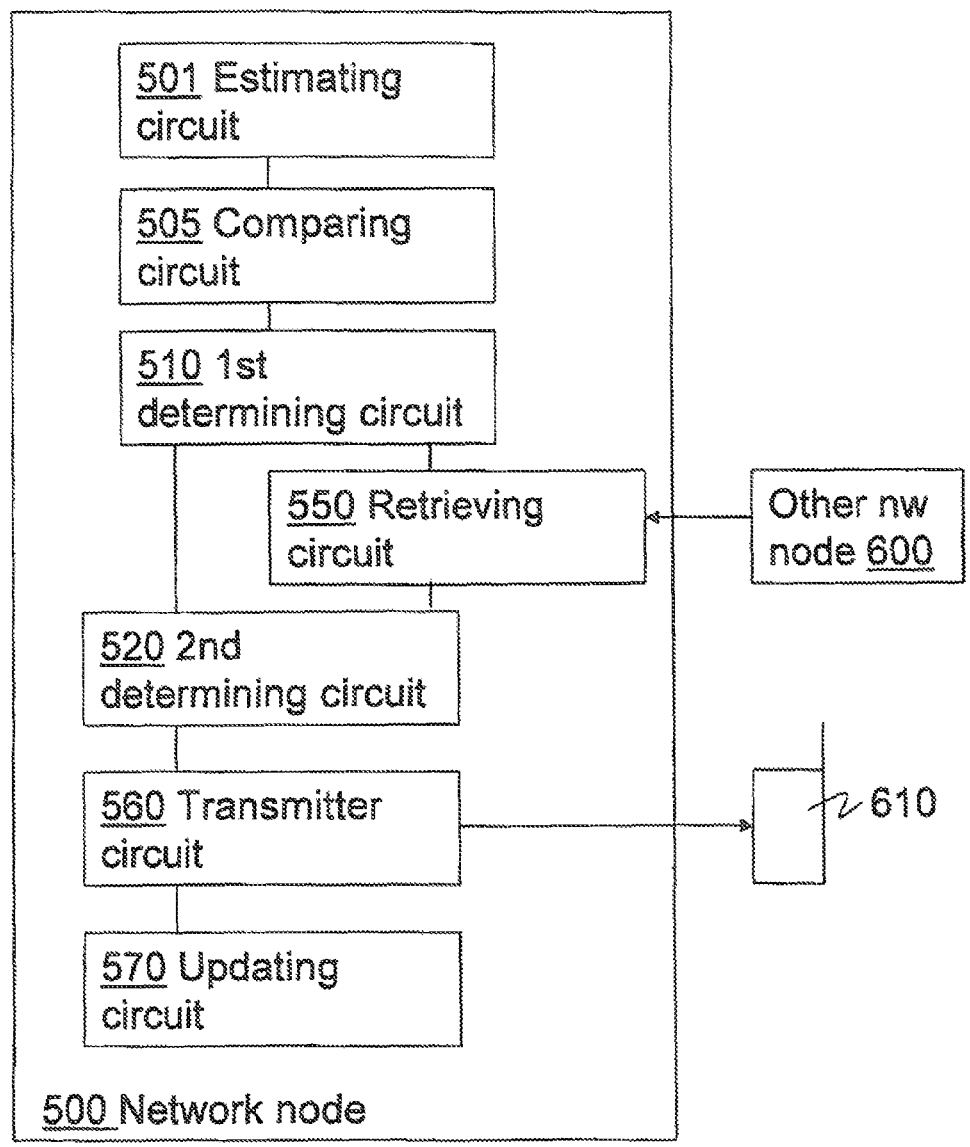

The network node is schematically illustrated in FIGS. 5a-b, according to embodiments. The network node 500 may in embodiments be a positioning node in a control plane or user plane architecture of an LTE network. The E-SMLC is an example of the positioning node in a control plane architecture, and SUPL is an example of the positioning node in a user plane architecture. The network node 500 is configured to be used in a wireless communication system such as an LTE system, and to determine an uncertainty of a timing measurement used for positioning of a wireless UE. The network node 500 comprises an estimating circuit 501 for estimating a timing measurement uncertainty, and a first determining circuit 510 for determining if an uncertainty reducing measurement is available. The estimating circuit 501 is in one embodiment adapted to estimate the timing measurement uncertainty based on a cell range. In another alternative embodiment it is adapted to estimate a first timing measurement uncertainty for a first cell and a second timing measurement uncertainty for a second cell, and select the smallest of the estimated first and second timing measurement uncertainties. The network node also comprises a second determining circuit 520 for determining a timing measurement uncertainty based on the estimated timing measurement uncertainty and the uncertainty reducing measurement, when the uncertainty reducing measurement is available.

In one embodiment, illustrated in FIG. 5a, the network node 500 also comprises an initiating circuit 530 for initiating a positioning method when the uncertainty reducing measurement is not available, and an obtaining circuit 540 for obtaining the uncertainty reducing measurement and/or a positioning result from the initiated positioning method. In this embodiment, the second determining circuit 520 is further adapted to determine the timing measurement uncertainty based on the estimated timing measurement uncertainty and the obtained uncertainty reducing measurement and/or positioning result.

In one embodiment, illustrated in FIG. 5b, the network node 500 also comprises a retrieving circuit 550 for retrieving an uncertainty reducing measurement from another network node 600 when the uncertainty reducing measurement is not available. The second determining circuit 520 is in this case further adapted to determine the timing measurement uncertainty based on the estimated timing measurement uncertainty and the retrieved uncertainty reducing measurement. The network node 500 further comprises a comparing circuit 505 for comparing the estimated timing measurement uncertainty with a predefined threshold. The first determining unit 510 is in this embodiment further adapted to only perform the determining when the estimated timing measurement uncertainty is larger than the predefined threshold. The threshold may in one embodiment correspond to the standardized 5 μs limit of how large the uncertainty may be. In an alternative embodiment the threshold may be configured dynamically, statically, or semi-statically. The network node 500 further comprises a transmitter circuit 560 for transmitting the determined timing measurement uncertainty to the wireless UE 610 in assistance data, in order for the UE to perform the timing measurement. The network node 500 also comprises an updating circuit 570 for updating an uncertainty map based on the determined timing measurement uncertainty. The uncertainty map associates a geographical area with a timing measurement uncertainty for a given timing measurement.

In any embodiment, the determining circuit 520 may further be adapted to determine the timing measurement uncertainty also based on a map associating a geographical area and the timing measurement, and/or based on information comprising one or more of a cell sector information, an undesirable signal arrival direction, a cell range limit and a reference signal time difference limit. The second determining circuit 520 may also be adapted to apply a shape conversion to convert the determined timing measurement uncertainty to a symmetric uncertainty range. Alternatively, it is further adapted to perform a mathematical optimization based on a Lagrange multiplier approach to convert the determined timing measurement uncertainty to a symmetric uncertainty range.

The circuits described above with reference to FIG. 5a-b are logical circuits and do not necessarily correspond to separate physical circuits.

Figure 5C:
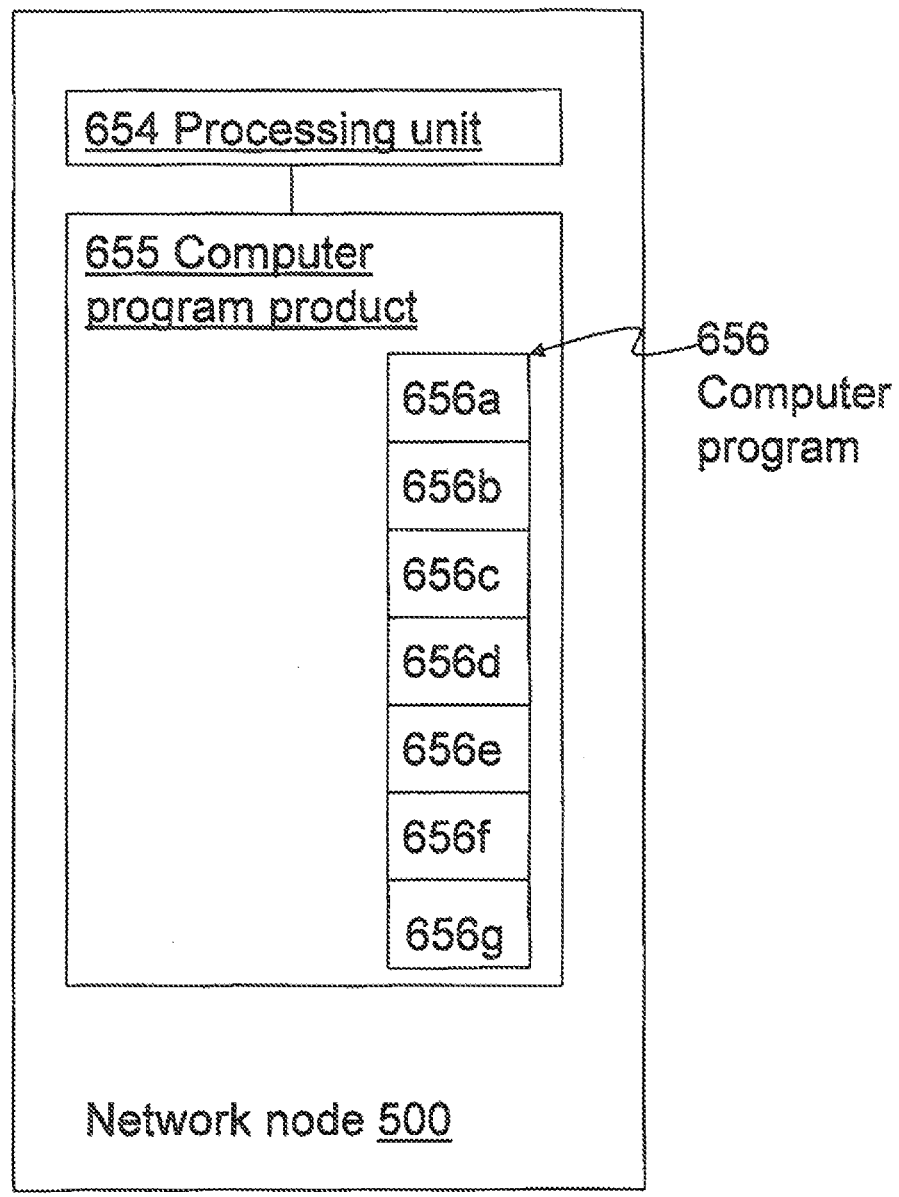

FIG. 5c schematically illustrates an embodiment of the network node 500, which is an alternative way of disclosing the embodiment illustrated in FIG. 5b. The network node 500 comprises a processing unit 654 which may be a single unit or a plurality of units. Furthermore, the network node 500 comprises at least one computer program product 655 in the form of a non-volatile memory, e.g. an EEPROM (Electrically Erasable Programmable Read-Only Memory), a flash memory or a disk drive. The computer program product 655 comprises a computer program 656, which comprises code means which when run on the network node 500 causes the processing unit 654 on the network node 500 to perform the steps of the procedures described earlier in conjunction with FIG. 4b.

Hence in the embodiments described, the code means in the computer program 656 of the network node 500 comprises an estimating module 656a for estimating a timing measurement uncertainty, a comparing module 656b for comparing the estimated timing measurement uncertainty with a predefined threshold, a first determining module 656c for determining if an uncertainty reducing measurement is available, a second determining module 656d for determining a timing measurement uncertainty based on the estimated timing measurement uncertainty and the uncertainty reducing measurement, a retrieving module 656e for retrieving the uncertainty reducing measurement from another network node when the uncertainty reducing measurement is not available, a transmitter module 656f for transmitting the determined timing measurement uncertainty in assistance data to the UE, and an updating module 656g for updating an uncertainty map based on the determined timing measurement uncertainty. The code means may thus be implemented as computer program code structured in computer program modules. The modules 656a-g essentially perform the steps of the flow in FIG. 4b to emulate the network node described in FIG. 5b. In other words, when the different modules 656a-g are run on the processing unit 654, they correspond to the units 501, 505, 510, 520, 550, 560, 570 of FIG. 5b.

Although the code means in the embodiment disclosed above in conjunction with FIG. 5c are implemented as computer program modules which when run on the network node 500 causes the node to perform the steps described above in conjunction with FIG. 4b, one or more of the code means may in alternative embodiments be implemented at least partly as hardware circuits.

The above mentioned and described embodiments are only given as examples and should not be limiting. Other solutions, uses, objectives, and functions within the scope of the invention as claimed in the accompanying patent claims may be possible.

ABBREVIATIONS

3GPP 3rd Generation Partnership Program
AECID Adaptive E-CID
A-GPS Assisted GPS
AoA Angle of Arrival
CID Cell Identity based positioning
E-CID Enhanced CID
eNodeB Evolved Node B
E-SMLC Evolved Serving Mobile Location Center
E-UTRAN Evolved UTRAN
FCC Federal Communications Commission
GNSS Global Navigation Satellite System
GPS Global Positioning System
LPP LTE Positioning Protocol
LPPa LPP annex
LTE Long Term Evolution
OTDOA Observed TDOA
PRS Positioning Reference Signal
QoS Quality of Service
RAN Radio Access Network
RBS Radio Base Station
RSRP Reference Signal Received Power
RSRQ Reference Signal Received Quality
RSTD Reference Signal Time Difference
RTD Relative Time Difference
SFN System Frame Number
SLP SUPL Location Platform
SUPL Secure User Plane Location
TA Timing Advance
TDOA Time Difference Of Arrival
UE User Equipment
UMTS Universal Mobile Telecommunications System
UTDOA Uplink TDOA
UTRAN Universal Terrestrial RAN

What is claimed is:
1. A method in a location server of a wireless communication system, of determining an uncertainty of a timing measurement used for positioning of a wireless device, the method comprising:
obtaining, by the location server, a first timing measurement uncertainty,
obtaining, by the location server, an uncertainty reducing measurement, and
determining, by the location server, a second timing measurement uncertainty based on the first timing measurement uncertainty and the uncertainty reducing measurement.

2. The method according to claim 1, further comprising:
   initiating a positioning method,
   obtaining at least one of the uncertainty reducing measurement and a positioning result from the initiated positioning method, and
   determining the second timing measurement uncertainty based on the first timing measurement uncertainty and the obtained at least one of the uncertainty reducing measurement and the positioning result.

3. The method according to claim 1, further comprising:
   retrieving the uncertainty reducing measurement from a network node, and
   determining the second timing measurement uncertainty based on the first timing measurement uncertainty and the retrieved uncertainty reducing measurement.

4. The method according to claim 1, further comprising:
   comparing the first timing measurement uncertainty with a predefined threshold, and wherein the obtaining the uncertainty reducing measurement is only performed when the first timing measurement uncertainty is larger than the predefined threshold.

5. The method according to claim 4, wherein the predefined threshold is 5 microseconds which corresponds to a maximum absolute value within the range [−5, +5] microseconds.

6. The method according to claim 1, wherein the first timing measurement uncertainty is obtained based on a cell range.

7. The method according to claim 1, wherein the obtaining a first timing measurement uncertainty comprises:
   obtaining a third timing measurement uncertainty for a first cell and a fourth timing measurement uncertainty for a second cell, and
   selecting the smallest of the third and fourth timing measurement uncertainties.

8. The method according to claim 1, further comprising transmitting the second timing measurement uncertainty in assistance data to the wireless device, in order for the wireless device to perform the timing measurement.

9. The method according to claim 1, wherein the timing measurement is a reference signal time difference measurement or a time of arrival measurement.

10. The method according to claim 1, wherein the timing measurement is used for a time-difference-of-arrival-based positioning of the wireless device.

11. The method according to claim 1, further comprising updating an uncertainty map based on the second timing measurement uncertainty, the uncertainty map associating a geographical area with a timing measurement uncertainty.

12. The method according to claim 1, wherein the second timing measurement uncertainty is also based on a map associating a geographical area and the timing measurement.

13. The method according to claim 1, wherein the second timing measurement uncertainty is also based on information comprising at least one of a cell sector information, an undesirable signal arrival direction, a cell range limit and a reference signal time difference limit.

14. The method according to claim 1, wherein the determining of the second timing measurement uncertainty further comprises applying a shape conversion to convert a region of the second timing measurement uncertainty to a symmetric uncertainty range.

15. The method according to claim 1, wherein the determining of the second timing measurement uncertainty further comprises performing a mathematical optimization based on a Lagrange multiplier approach to determine the second timing measurement uncertainty to be an uncertainty circle or ellipse.

16. A location server configured to be used in a wireless communication system, and to determine an uncertainty of a timing measurement used for positioning of a wireless device, the location server comprising a processor and a memory, wherein the memory is encoded with computer program code which, when executed by the processor, performs the following:
   obtaining, at the location server, a first timing measurement uncertainty,
   obtaining, at the location server, an uncertainty reducing measurement, and
   determining, at the location server, a second timing measurement uncertainty based on the first timing measurement uncertainty and the uncertainty reducing measurement.

17. The location server according to claim 16, wherein the memory is further encoded with computer program code which, when executed by the processor, performs the following:
   initiating a positioning method,
   obtaining at least one of the uncertainty reducing measurement and a positioning result from the initiated positioning method,
   determining the second timing measurement uncertainty based on the first timing measurement uncertainty, and the obtained at least one of the uncertainty reducing measurement and the positioning result.

18. The location server according to claim 16, wherein the memory is further encoded with computer program code which, when executed by the processor, performs the following:
   retrieving an uncertainty reducing measurement from a network node when the uncertainty reducing measurement is not available,
   determining the second timing measurement uncertainty based on the first timing measurement uncertainty and the retrieved uncertainty reducing measurement.

19. The location server according to claim 16, wherein the memory is further encoded with computer program code which, when executed by the processor, performs the following:
   comparing the first timing measurement uncertainty with a predefined threshold,
   wherein obtaining the first timing measurement uncertainty is only performed when the first timing measurement uncertainty is larger than the predefined threshold.

20. The location server according to any of claim 16, wherein obtaining the first timing measurement uncertainty is based on a cell range.

21. The location server according to claim 16, wherein obtaining the first timing measurement uncertainty comprises:
   obtaining a third timing measurement uncertainty for a first cell and a fourth timing measurement uncertainty for a second cell, and
   selecting the smallest of the third and fourth timing measurement uncertainties.

22. The location server according to claim 16, further comprising a transmitter circuit to transmit the second timing measurement uncertainty to the wireless device in assistance data, in order for the wireless device to perform the timing measurement.

23. The location server according to claim 16, wherein the memory is further encoded with computer program code which, when executed by the processor, updates an uncertainty map based on the second timing measurement uncertainty, the uncertainty map associating a geographical area with a timing measurement uncertainty.

24. The location server according to claim 16, wherein determining the second timing measurement uncertainty is further based on a map associating a geographical area and the timing measurement.

25. The location server according to claim 16, wherein determining the second timing measurement uncertainty is further based on information comprising at least one of a cell sector information, an undesirable signal arrival direction, a cell range limit and a reference signal time difference limit.

26. The location server according to claim 16, wherein the memory is further encoded with computer program code which, when executed by the processor, applies a shape conversion to convert a region of the second timing measurement uncertainty to a symmetric uncertainty range.

27. The location server according to claim 16, wherein the memory is further encoded with computer program code which, when executed by the processor, performs a mathematical optimization based on a Lagrange multiplier approach to determine the second timing measurement uncertainty to be an uncertainty circle or ellipse.

28. The location server according to claim 16, wherein the location server is a positioning node in a control plane or user plane architecture.

29. A method in a wireless device of a wireless communication system, where a location server determines an uncertainty of a timing measurement used for positioning the wireless device, the method comprising:
receiving, from the location server, a second timing measurement uncertainty through an assistance data, wherein the second timing measurement uncertainty is obtained by the location server based on a first timing measurement uncertainty and a uncertainty reducing measurement;
performing a timing measurement using the second timing measurement uncertainty.

30. The method according to claim 29, wherein the timing measurement is a second uncertainty reducing measurement, and the method further comprising: transmitting the second uncertainty reducing measurement to the location server.

31. A wireless device of a wireless communication system, wherein a location server determines an uncertainty of a timing measurement used for positioning the wireless device, comprising a processor and a memory, wherein the memory is encoded with computer program code which, when executed by the processor, performs the following:
receiving, from the location server, a second timing measurement uncertainty through an assistance data, wherein the second timing measurement uncertainty is obtained by the location server based on a first timing measurement uncertainty and a uncertainty reducing measurement;
performing a positioning measurement using the second timing measurement uncertainty.

32. The wireless device according to claim 31, wherein the positioning measurement is a second uncertainty reducing measurement, the wireless device further comprising:
a transmitter to transmit the second uncertainty reducing measurement to the location server.

33. The method according to claim 29, wherein the timing measurement is an Observed Time Difference Of Arrival (OTDOA) measurement.

34. The method according to claim 33, wherein the uncertainty reducing measurement is at least one of a signal strength measurement, a signal quality measurement, an Assisted Global Navigation Satellite System (A-GNSS) measurement, a Timing Advance (TA) measurement, or an Angle of Arrival (AoA) measurement.

35. The method according to claim 29, wherein the first timing measurement uncertainty is the smaller of a third timing measurement uncertainty for a first cell and a fourth timing measurement uncertainty for a second cell.

36. The method according to claim 29, wherein the second timing measurement uncertainty is mathematically optimized based on a Lagrange multiplier approach to be an uncertainty circle or ellipse.

37. The wireless device according to claim 31, wherein the timing measurement is an Observed Time Difference Of Arrival (OTDOA) measurement.

38. The wireless device according to claim 37, wherein the uncertainty reducing measurement is at least one of a signal strength measurement, a signal quality measurement, an Assisted Global Navigation Satellite System (A-GNSS) measurement, a Timing Advance (TA) measurement, or an Angle of Arrival (AoA) measurement.

39. The wireless device according to claim 31, wherein the first timing measurement uncertainty is the smaller of a third timing measurement uncertainty for a first cell and a fourth timing measurement uncertainty for a second cell.

40. The wireless device according to claim 31, wherein the second timing measurement uncertainty is mathematically optimized based on a Lagrange multiplier approach to be an uncertainty circle or ellipse.

41. The method according to claim 1, wherein the timing measurement is an Observed Time Difference Of Arrival (OTDOA) measurement.

42. The method according to claim 1, wherein the uncertainty reducing measurement is at least one of a signal strength measurement, a signal quality measurement, an Assisted Global Navigation Satellite System (A-GNSS) measurement, a Timing Advance (TA) measurement, or an Angle of Arrival (AoA) measurement.

43. The network node according to claim 16, wherein the timing measurement is an Observed Time Difference Of Arrival (OTDOA) measurement.

44. The network node according to claim 16, wherein the uncertainty reducing measurement is at least one of a signal strength measurement, a signal quality measurement, an Assisted Global Navigation Satellite System (A-GNSS) measurement, a Timing Advance (TA) measurement, or an Angle of Arrival (AoA) measurement.

* * * * *

UNITED STATES PATENT AND TRADEMARK OFFICE
CERTIFICATE OF CORRECTION

PATENT NO. : 9,684,057 B2  
APPLICATION NO. : 14/220800  
DATED : June 20, 2017  
INVENTOR(S) : Siomina et al.

Page 1 of 1

It is certified that error appears in the above-identified patent and that said Letters Patent is hereby corrected as shown below:

In the Specification

Column 4, Line 61, change "(-8192.8191)" to --(-8192..8191)--

Column 4, Line 62, change "(0.10234)" to --(0..10234)--

Column 15, Lines 16-17, change "s1 and c2" to --€1 and €2--

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*